Feb. 4, 1930.                E. H. GREIBACH                1,745,849
                          SPEED INDICATING DEVICE
                          Filed March 31, 1927
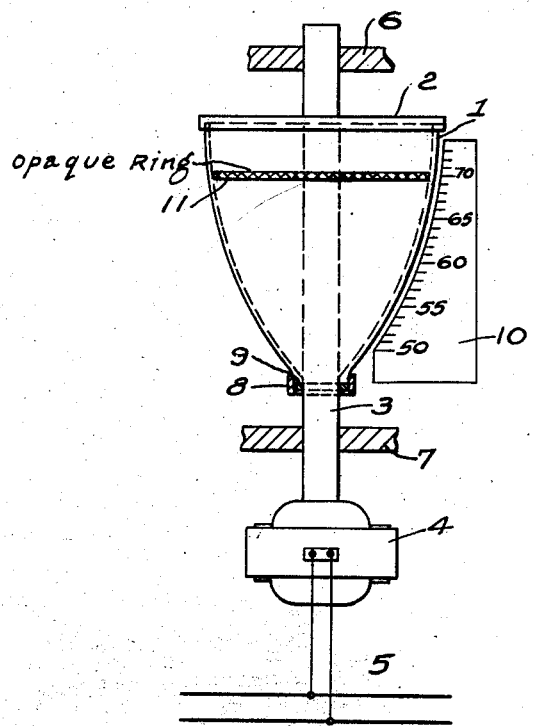
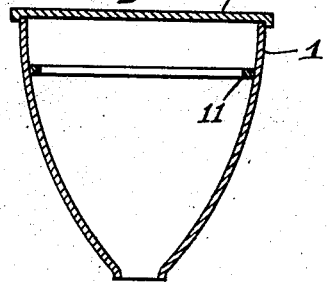
WITNESSES:                                    INVENTOR
                                            Emil H. Greibach.
                                         BY
                                              ATTORNEY Patented Feb. 4, 1930

1,745,849

UNITED STATES PATENT OFFICE

EMIL HENRY GREIBACH, OF PITTSBURGH, PENNSYLVANIA, ASSIGNOR TO WESTINGHOUSE ELECTRIC & MANUFACTURING COMPANY, A CORPORATION OF PENNSYLVANIA

SPEED-INDICATING DEVICE

Application filed March 31, 1927. Serial No. 179,776.

My invention relates to speed-indicating devices and more particularly to means for indicating the frequency of the current traversing an electrical circuit.

My invention has, for an object, to provide a new and improved device for indicating the speed of a synchronous motor that is connected to an electric circuit.

Another object of my invention is to provide a speed-indicating device that shall be relatively easy to read and accurate in its operation.

A further object of my invention is to provide a device for indicating relatively small changes in the frequency of an alternating current.

My invention comprises in general, a cup or container adapted to rotate in accordance with the speed of rotation of a synchronous motor connected to an alternating-current circuit.

Disposed within the container is one or more structures, such as small metallic balls or, and preferably, a quantity of a suitable liquid, such as mercury, which, due to the flaring shape of the container and to the small mass of the mercury compared to the capacity of the container, is bodily displaced upon rotation of the container and forms a clear and well defined ring in the cup beginning at a predetermined speed of rotation of the said cup because of the relatively great surface tension of the mercury. As the speed of rotation of the cup increases, the ring of mercury rises. The cup or container is made of a transparent material, such as glass. A scale, calibrated in frequency, is disposed near the surface of the cup in such manner that the position of the ring may be easily read. The middle of the scale is adapted to indicate the normal frequency of the line, and the ring of mercury is normally held at this position by the centrifugal forces acting on the mercury. Upon an increase in frequency, the synchronous motor will increase its speed, and the mercury will rise in the cup to a region adjacent the scale indicative of the frequency of the circuit.

My invention may be readily understood by reference to the accompanying drawing, in connection with the following description.

Figure 1 of the drawing is a view, partially in elevation and partially in section, of one form of speed-indicating device constructed in accordance with my invention.

Figure 2 is a vertical cross sectional view of the cup shown in Figure 1.

A transparent container 1, having a cover 2, is secured to a shaft 3 of a synchronous motor 4 that is electrically connected to an electrical circuit 5. The shaft 3 is journalled within an upper bearing 6 and a lower bearing 7. The container 1 is secured to the shaft 3 by an annular member 8 and a gasket 9. A scale 10, graduated in frequency, is disposed adjacent to the surface of the cup 1. A predetermined quantity of mercury 11 is contained within the cup 1. The operation of the device is as follows:

Upon rotation of the cup 1, the mercury 11 is entirely or bodily moved from the cup bottom and forms a ring within the cup by virtue of the centrifugal forces acting thereon and the flared configuration of the wall of the cup. Since the cup is of a transparent material and mercury is an opaque liquid, the vertical position of the ring of mercury is clearly indicated by the graduations upon the scale 10.

It is well known that the speed of a synchronous motor is directly proportional to the frequency of an alternating current traversing its circuit. The speed of rotation of the shaft 3 is, therefore, proportional to the frequency of the current in the electric circuit 5 and, upon an increase in frequency of said current, the shaft 3 will rotate at an increase of speed that is proportional to such increase in frequency. The shape of the cup 1 is such that the mercury ring 11 will move in a vertical direction in increments that are substantially proportional to frequency increments.

The device is relatively accurate in its operation and is sensitive by virtue of the fact that the speed of rotation of the shaft 3 is directly proportional to the frequency of the electrical circuit to which the synchronous motor is connected.

The ring 11 assumes a position of equilibrium under the action of the centrifugal forces acting on it and immediately takes a position that is governed by the speed of rotation of the container 1. The position of the ring of mercury is, therefore, sensitive to changes in frequency and is clearly indicated by the scale 10.

By using just enough of the displaceable liquid to form a thin ring, the device lends itself readily to a construction that will result in a high degree of sensitivity. The well defined and easily seen ring of mercury ascends and descends the inner surface of the container when the frequency of the circuit is respectively increased or descends.

While I have shown my device in cooperation with a synchronous motor and an electrical circuit, I do not wish to be so limited and confined, since the inventive feature may be readily applied to any rotating devices, the speed of which it is desirable to determine.

I claim as my invention:

1. A speed-indicating device comprising a cup of transparent material rotatable about a vertical axis, an opaque mobile material contained in said cup of sufficient quantity to apparently form a distinct ring therein when said cup is rotated, said ring assuming different vertical positions in accordance with the speed of rotation of said cup, and a scale disposed adjacent to the wall of said cup for indicating the position of said ring with reference to said scale.

2. A speed-indicating device comprising a cup of transparent material rotatable about a vertical axis, an opaque mobile material contained in said cup of sufficient quantity to apparently form a distinct ring therein when said cup is rotated, said ring assuming different vertical positions in accordance with the speed of rotation of said cup, and a vertical scale calibrated in terms of speed disposed adjacent to the exterior wall of said cup for indicating by the position of said ring with reference to said scale the speed of rotation of said cup.

In testimony whereof, I have hereunto subscribed my name this 28th day of March, 1927.

EMIL HENRY GREIBACH.